US009239092B2

(12) United States Patent
Nowaczyk et al.

(10) Patent No.: US 9,239,092 B2
(45) Date of Patent: Jan. 19, 2016

(54) SHOCK ABSORBER WITH FREQUENCY DEPENDENT PASSIVE VALVE (71) Applicant: Tenneco Automotive Operating Company Inc., Lake Forest, IL (US)

(72) Inventors: Mark Nowaczyk, Heers (BE); Gunther Bismans, Alken (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 13/975,454

(22) Filed: Aug. 26, 2013

(65) Prior Publication Data

US 2015/0053518 A1 Feb. 26, 2015

(51) Int. Cl.
F16F 9/50 (2006.01)

(52) U.S. Cl.
CPC .......................................... *F16F 9/50* (2013.01)

(58) Field of Classification Search
CPC ........... F16F 9/5126; F16F 9/504; F16F 9/50; F16F 9/512
See application file for complete search history.

(56) References Cited

U.S. PATENT DOCUMENTS

| 1,268,452 | A | * | 6/1918 | Goodyear | 188/275 |
|---|---|---|---|---|---|
| 2,911,072 | A | * | 11/1959 | Becker et al. | 188/315 |
| 5,129,488 | A | | 7/1992 | Furuya et al. | |
| 5,248,014 | A | | 9/1993 | Ashiba | |
| 5,386,892 | A | | 2/1995 | Ashiba | |
| 5,423,402 | A | | 6/1995 | de Kock | |
| 5,467,852 | A | | 11/1995 | de Kock | |
| 6,264,015 | B1 | * | 7/2001 | De Kock | 188/282.8 |
| 6,334,516 | B1 | | 1/2002 | Shirley et al. | |
| 7,395,907 | B2 | | 7/2008 | de Kock et al. | |
| 2004/0200946 | A1 | * | 10/2004 | Pradel et al. | 248/560 |
| 2005/0045440 | A1 | | 3/2005 | Kock et al. | |
| 2012/0160624 | A1 | | 6/2012 | Katayama et al. | |
| 2012/0217106 | A1 | | 8/2012 | O'Flynn et al. | |
| 2013/0048451 | A1 | * | 2/2013 | Yamashita | 188/280 |
| 2013/0056317 | A1 | | 3/2013 | Kim | |
| 2014/0048366 | A1 | * | 2/2014 | Lee et al. | 188/322.15 |
| 2015/0047936 | A1 | * | 2/2015 | Slusarczyk et al. | 188/313 |

FOREIGN PATENT DOCUMENTS

| DE | 43 27 358 A1 | 10/1994 |
|---|---|---|
| EP | 1442227 A1 | 8/2004 |

(Continued)

OTHER PUBLICATIONS

Search Report and Written Opinion dated Sep. 24, 2014 in corresponding PCT Application No. PCT/US2014/038874 (10 pages).

*Primary Examiner* — Bradley King
*Assistant Examiner* — Stephen Bowes
(74) *Attorney, Agent, or Firm* — Harness, Dickey & Pierce, P.L.C.

(57) ABSTRACT

A shock absorber has a pressure tube with a piston assembly slidably disposed within the pressure tube and attached to a piston rod. The piston assembly divides the pressure tube into an upper working chamber and a lower working chamber. The piston assembly includes a frequency dependent valve assembly attached to the piston rod which defines a housing attached to the piston rod and a spool valve assembly. The spool valve assembly includes a spool valve and a bypass valve assembly that controls fluid flow through bypass passage that bypasses the piston assembly.

9 Claims, 5 Drawing Sheets

(56) References Cited

FOREIGN PATENT DOCUMENTS

| | | | | |
|---|---|---|---|---|
| EP | 1 422 227 B1 | 4/2006 | | |
| FR | 1064843 A | * 5/1954 | ............ | F16F 9/3214 |
| JP | 03129137 A | * 6/1991 | ................ | F16F 9/50 |
| JP | 07-174183 | 7/1995 | | |
| JP | 07-217696 | 8/1995 | | |
| JP | 2011-007213 | 1/2011 | | |
| JP | 2012-067880 | 4/2012 | | |
| WO | 2011-120119 | 10/2011 | | |

* cited by examiner

SHOCK ABSORBER WITH FREQUENCY DEPENDENT PASSIVE VALVE

FIELD OF THE INVENTION

The present disclosure relates to a hydraulic damper or shock absorber adapted for use in a suspension system such as the systems used for automotive vehicles. More particularly, the present disclosure relates to a hydraulic damper having a frequency dependent passive valving system that provides softer damping characteristics with high frequency road inputs in rebound and compression strokes.

BACKGROUND OF THE INVENTION

A conventional prior art hydraulic damper or shock absorber comprises a cylinder defining a working chamber having a piston slidably disposed in the working chamber with the piston separating the interior of the cylinder into an upper and a lower working chamber. A piston rod is connected to the piston and extends out of one end of the cylinder. A first valving system is incorporated for generating damping force during the extension or rebound stroke of the hydraulic damper and a second valving system is incorporated for generating damping force during the compression stroke of the hydraulic damper.

Various types of damping force generating devices have been developed to generate desired damping forces in relation to the frequency of the inputs from the roads over which the vehicle travels. These frequency dependent selective damping devices provide the ability to have softer damping characteristics with higher frequency road inputs. These softer damping characteristics lead to a more effective isolation of the vehicle body from unwanted disturbances. Typically these frequency dependent damping devices operate only during an extension or rebound movement of the hydraulic damper or shock absorber.

The continued development of hydraulic dampers includes the development of frequency dependent damping devices that improve the function in an extension/rebound movement or a compression movement of the hydraulic damper or shock absorber.

SUMMARY OF THE INVENTION

The present disclosure provides the art with a frequency dependent hydraulic damper or shock absorber that provides soft damping in rebound or compression strokes of the hydraulic damper or shock absorber. Soft damping is provided for the higher frequency road inputs in the extension/rebound stroke or the compression stroke of the hydraulic damper or shock absorber.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses.

Figure 1:
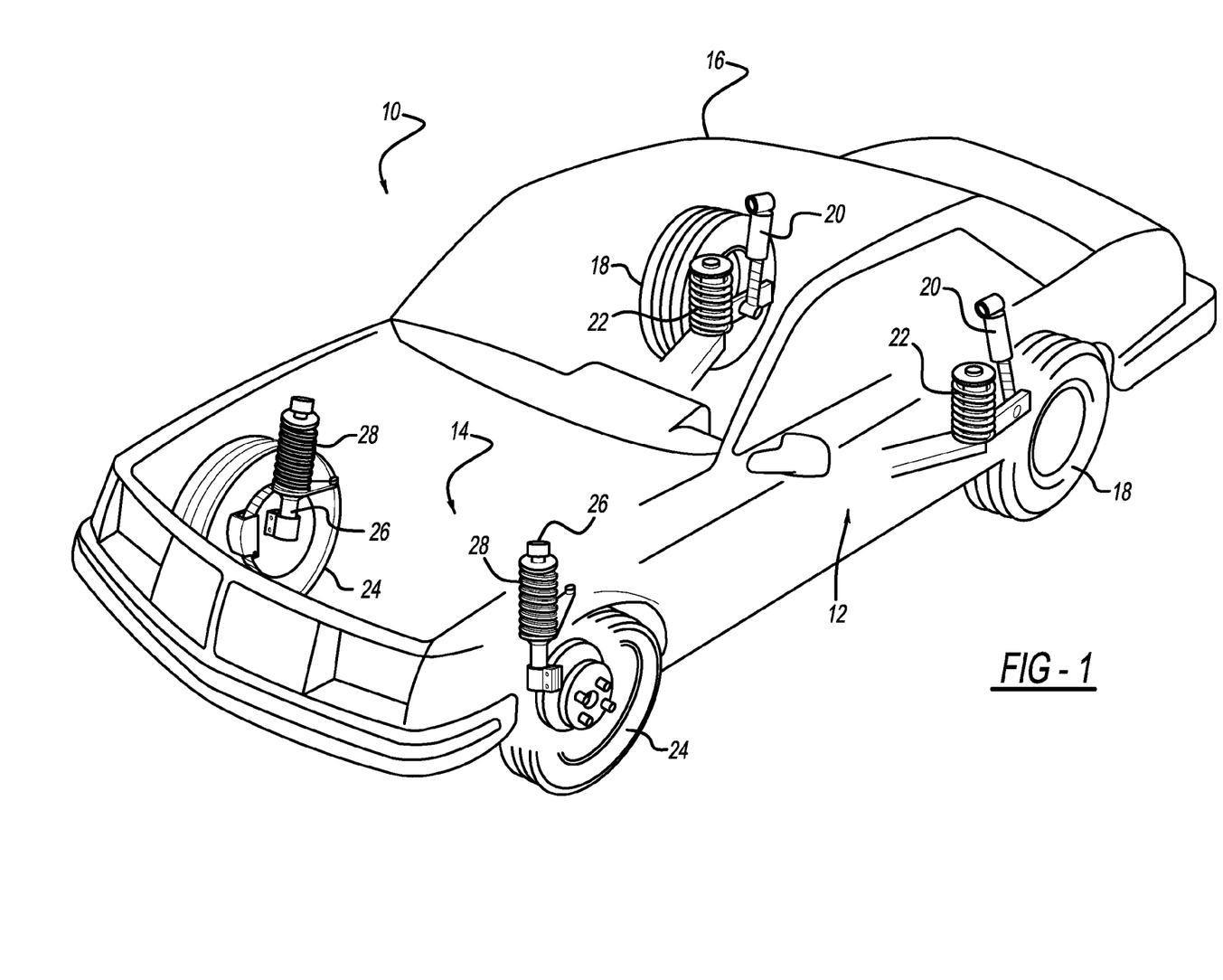
FIG. 1 is an illustration of an automobile using shock absorbers incorporating the frequency dependent damping device in accordance with the present disclosure.

Referring now to the drawings in which like reference numerals designate like or corresponding parts throughout the several views, there is shown in FIG. 1 a vehicle incorporating a suspension system having the frequency dependent shock absorbers in accordance with the present disclosure which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
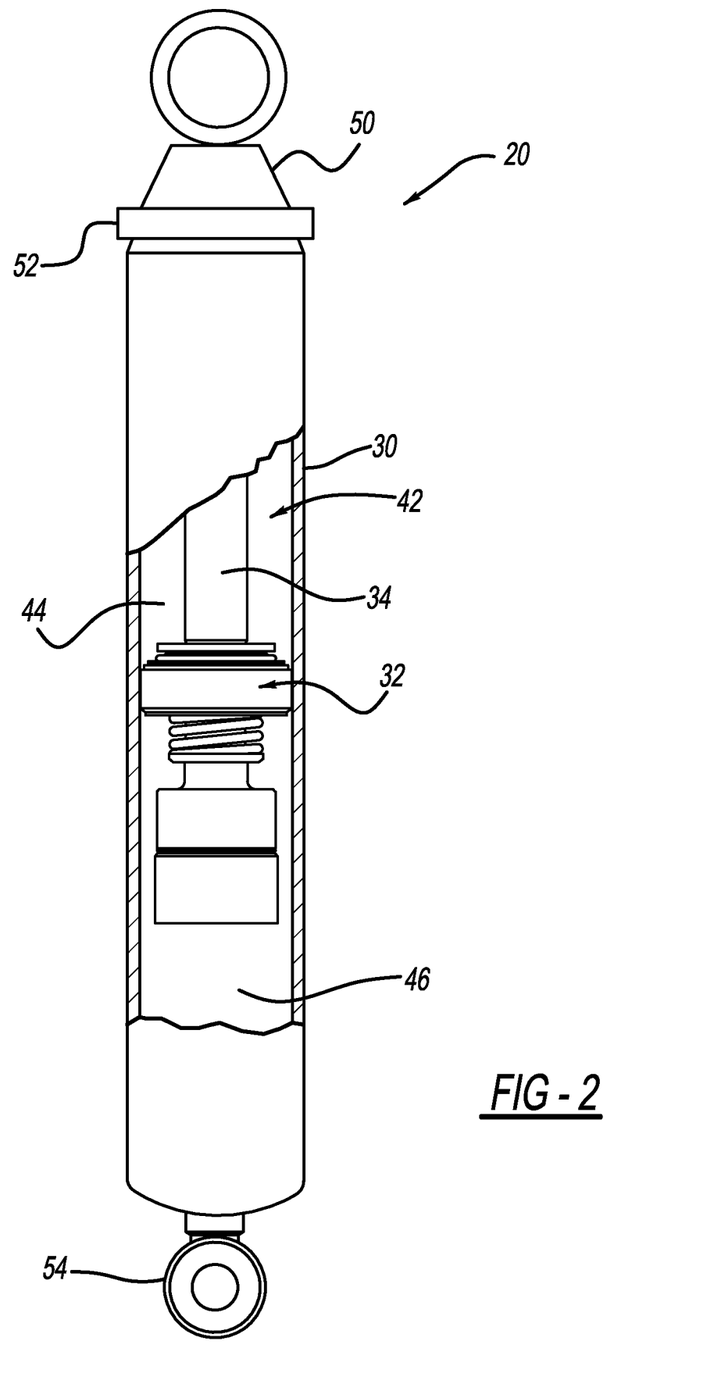
FIG. 2 is a cross-sectional side view of a monotube shock absorber incorporating either one the frequency dependent damping devices in accordance with the present disclosure.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32 and a piston rod 34.

Pressure tube 30 defines a fluid chamber 42. Piston assembly 32 is slidably disposed within pressure tube 30 and divides fluid chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50 and piston rod 34. The end of piston rod 34 opposite to piston assembly 32 is adapted to be secured to the sprung portion of vehicle 10. In the preferred embodiment, piston rod 34 is secured to body 16 or the sprung portion of vehicle 10. Pressure tube 30 is filled with fluid and it includes a fitting 54 for attachment to the unsprung portion of the vehicle. In the preferred embodiment fitting 54 is secured to the unsprung portion of the vehicle. Thus, suspension movements of the vehicle will cause extension or compression movements of piston assembly 32 with respect to pressure tube 30. Valving within piston assembly 32 controls the movement of fluid between upper working chamber 44 and lower working chamber 46 during movement of piston assembly 32 within pressure tube 30.

Figure 3:
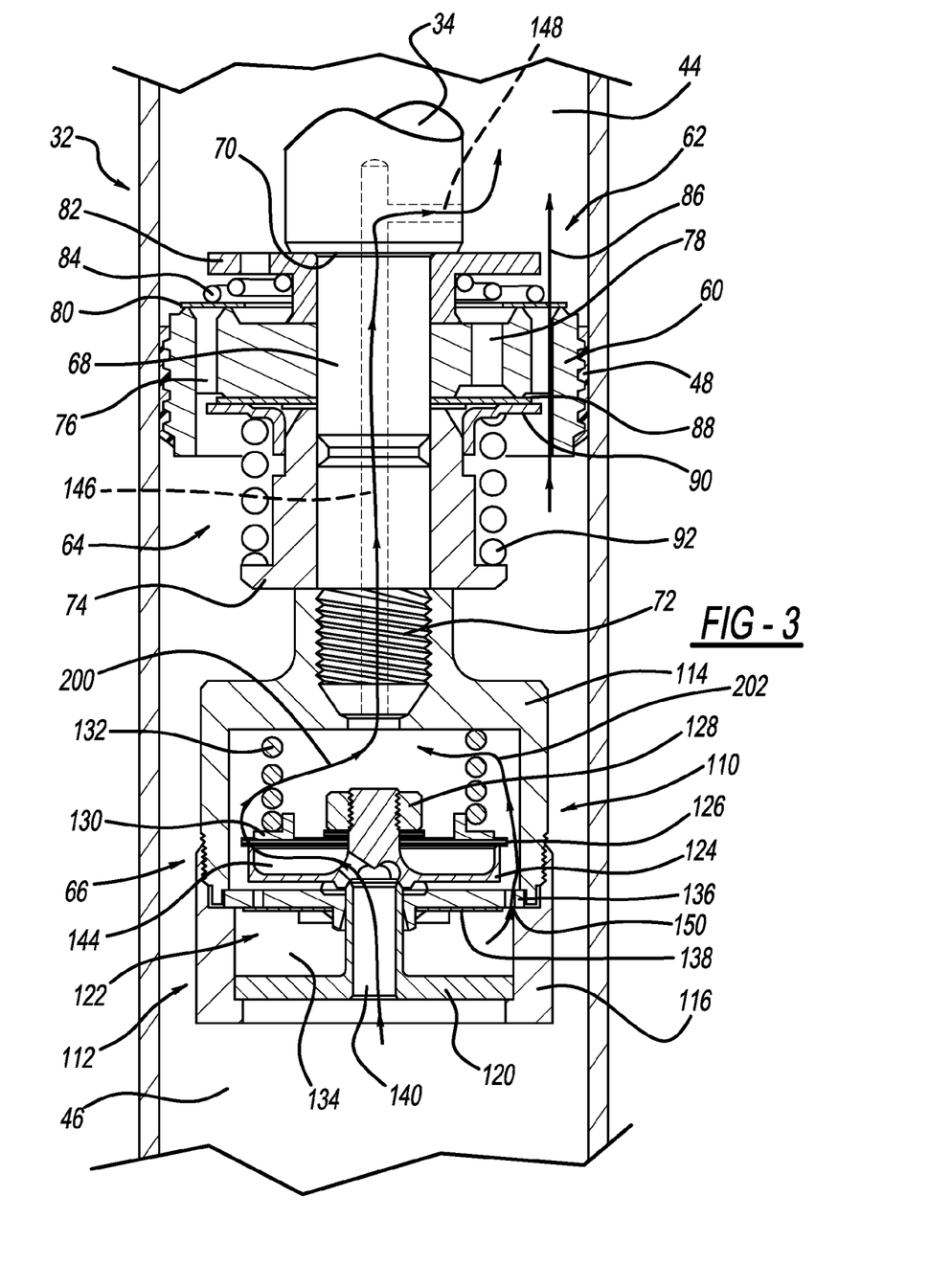
FIG. 3 is an enlarged cross-sectional side view illustrating a piston assembly of the shock absorber shown in FIG. 1 during incorporating a frequency dependent damping device which functions during a compression stroke of the shock absorber.
Figure 4:
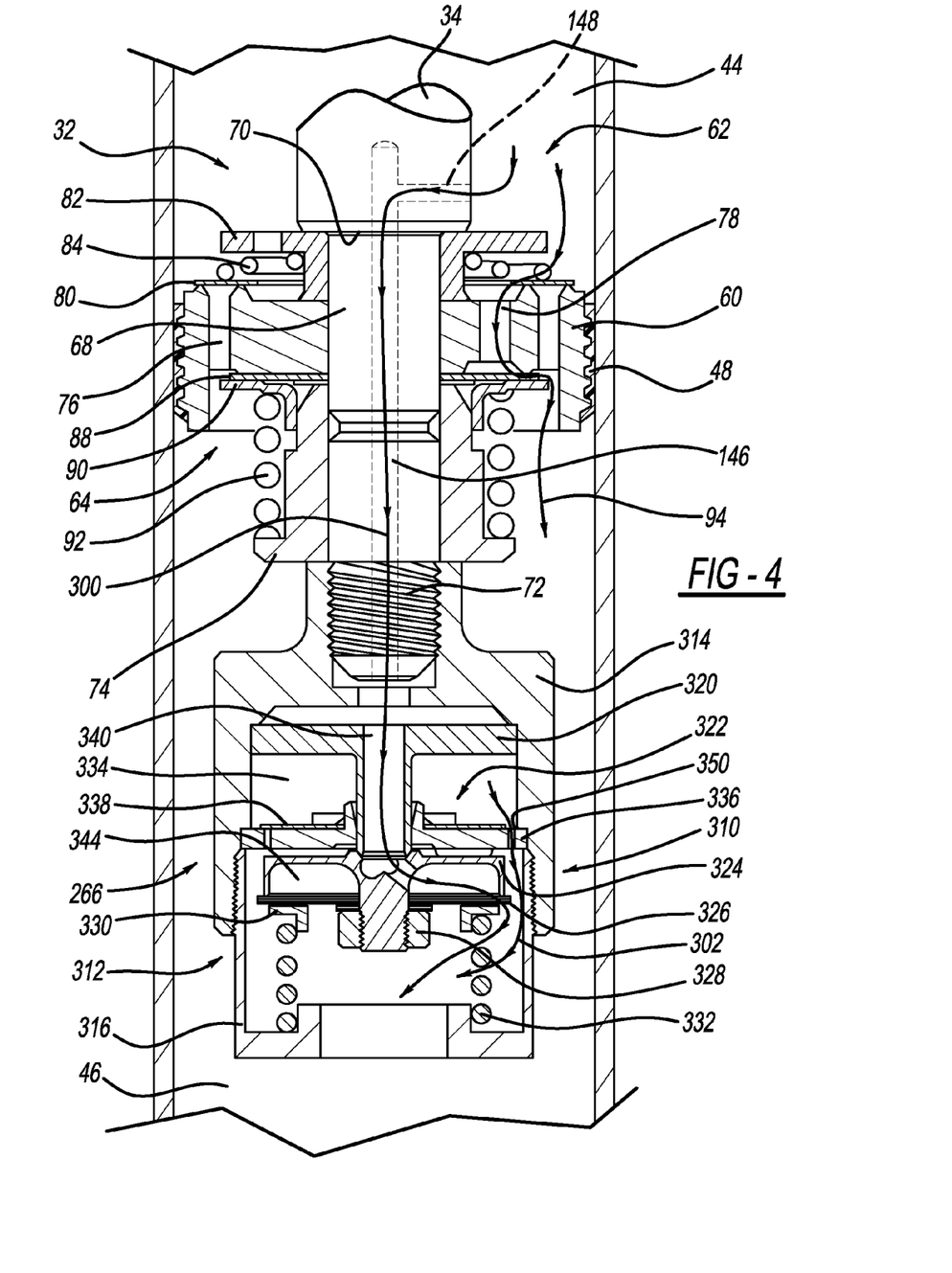
FIG. 4 is an enlarged cross-sectional side view illustrating a piston assembly of the shock absorber shown in FIG. 1 during incorporating a frequency dependent device which functions during an extension stroke of the shock absorber.

Referring now to FIGS. 3 and 4, piston assembly 32 is attached to piston rod 34 and comprises a piston body 60, a compression valve assembly 62, an extension or rebound valve assembly 64 and a frequency dependent valve assembly 66 illustrated in FIG. 3 or a frequency dependent valve assembly 266 illustrated in FIG. 4. Piston rod 34 includes a reduced diameter section 68 located on the end of piston rod 34 disposed within pressure tube 30 to form a shoulder 70 for mounting the remaining components of piston assembly 32. Piston body 60 is located on reduced diameter section 68 with compression valve assembly 62 being located between piston body 60 and shoulder 70 and with rebound valve assembly 64 being located between piston body 60 and a threaded end 72 of piston rod 34. A retaining nut 74 is threadingly or slidingly received on threaded end 72 or reduced diameter section 68 of piston rod 34 to secure piston body 60, compression valve assembly 62 and extension or rebound valve assembly 64 to piston rod 34. Piston body 60 defines a plurality of compression flow passages 76 and a plurality of rebound flow passages 78.

Compression valve assembly 62 comprises a compression valve plate 80, a valve stop 82 and a spring 84. Valve plate 80 is disposed adjacent to piston body 60 to cover the plurality of compression flow passages 76. Valve stop 82 is disposed adjacent shoulder 70 and spring 84 is disposed between valve plate 80 and valve stop 82 to bias valve plate 80 against piston body 60. During a compression stroke of shock absorber 20, fluid pressure builds up in lower working chamber 46 until the fluid pressure applied to valve plate 80 through compression flow passages 76 overcomes the load provided by spring 84. Valve plate 80 will move away from piston body 60 and compress spring 84 to open compression flow passages 76 to allow fluid to flow from lower working chamber 46 to upper working chamber 44 as shown by arrows 86 in FIG. 3.

Rebound valve assembly 64 comprises one or more valve plates 88, a spring seat 90 and a spring 92. Valve plates 88 are disposed adjacent to piston body 60 to cover the plurality of rebound flow passages 78. Spring seat 90 is disposed immediately adjacent valve plates 88. Spring 92 is disposed between spring seat 90 and retaining nut 74 to bias spring seat 90 against valve plates 88 and valve plates 88 against piston body 60. Retaining nut 74 is threaded onto threaded end 72 of piston rod 34 to retain valve plates 88 against piston body 60 to close rebound flow passages 78 using spring 92 and spring seat 90. During an extension stroke of shock absorber 20, fluid pressure builds up in upper working chamber 44 until the fluid pressure applied to valve plates 88 through rebound flow passages 78 overcomes the load provided by spring 92. Valve plates 88 will move away from piston body 60 and compress spring 92 to open rebound flow passages 78 to allow fluid to flow from upper working chamber 44 to lower working chamber 46 as shown by arrows 94 in FIG. 4.

Referring now to FIG. 3, frequency dependent valve assembly 66 is illustrated. Frequency dependent valve assembly 66 provides frequency dependent damping in compression only. FIG. 4 illustrates a frequency dependent valve assembly 266 for shock absorber 20 which provides frequency dependent damping in rebound (extension) only. Frequency dependent valve assembly 66 includes a housing assembly 110 and a spool valve assembly 112. Housing assembly 110 includes an upper housing 114 and a lower housing 116. Upper housing 114 is threadingly or otherwise attached to the end of piston rod 34. Lower housing 116 is threadingly or otherwise attached to upper housing 114.

Spool valve assembly 112 includes a spool valve 120, a check valve 122, an interface 124 and a plurality of valve discs 126 forming a bypass valve assembly, a retaining nut 128, a spring seat 130 and a spring 132. Spool valve 120 is disposed within a fluid cavity 134 defined by housing assembly 110. Check valve 122 includes a valve seat 136 and a valve plate 138. Spool valve 120 is slidably disposed within both valve seat 136 and housing assembly 110.

Interface 124 is disposed against spool valve 120. The plurality of valve discs 126 are disposed against interface 124. Retaining nut 128 is threadingly or otherwise received on interface 124 to retain the plurality of valve discs 126 on interface 124. Spring seat 130 is disposed against the plurality of valve discs 126 and spring 132 is disposed between housing assembly 110 and spring seat 130 to bias spring seat 130 against the plurality of valve discs 126 and the plurality of valve discs 126 against interface 124.

FIG. 3 illustrates fluid flow during a compression stroke of shock absorber 20. During a compression stroke, fluid pressure in lower working chamber 46 and in compression flow passages 76 will increase until the biasing load on valve plate 80 increases to the point that spring 84 is compressed and valve plate 80 is lifted entirely off of piston body 60 to fully open compression flow passages 76 as illustrated by arrow 86. Compression valve assembly 62 is a passive valve assembly with a firm damping characteristic.

At the beginning of the compression stroke, prior to the opening of compression valve assembly 62, fluid will flow through a bypass flow path illustrated by arrow 200 which bypasses piston body 60, compression valve assembly 62 and rebound valve assembly 64. Flow path 200 extends from lower working chamber 46 through an axial passage 140 in spool valve 120 into a bypass chamber 144 defined by interface 124 and the plurality of valve discs 126. Flow path 200 proceeds around the plurality of valve discs 126 into an axial fluid passage 146 and a radial passage 148 both extending through piston rod 34. During a high frequency movement, spool valve 120 moves only a small distance. Because of this small movement, the preload created by spring 132 is low and the fluid pressure in bypass chamber 144 will easily deflect the plurality of valve discs 126 to create the flow illustrated by arrow 200 which depicts flow through axial passage 146 and radial passage 148, both extending through piston rod 34 into upper working chamber 44. During a low frequency movement, spool valve 120 is able to move a significant distance. This larger movement will move interface 124, the plurality of valve discs 126 and spring seat 130. This movement will compress spring 132 which increases the preload generated by spring 132 and the fluid pressure required to separate the plurality of valve discs 126 from interface 124. As the load generated by spring 132 increases, the flow depicted by arrow 200 will decrease to provide a smooth transition from an initially soft damping condition to a firm damping condition for shock absorber 20. The slow closing of fluid flow 200 by the movement of spool valve 120 will provide the smooth transition. Arrow 202 depicts the flow of fluid out of fluid cavity 134 during movement of spool valve 120 during a compression stroke. Fluid flows from fluid cavity 134 through a tunable orifice 150 in valve seat 136 and into axial passage 146 which leads to radial passage 148 which leads to upper working chamber 44. Check valve 122 remains closed during this movement of spool valve 120 during a compression stroke and opens to allow for the return of fluid into fluid cavity 134 from upper working chamber 44 through radial passage 148 and through axial passage 146 during a rebound stroke.

Referring now to FIG. 4, frequency dependent valve assembly 266 is illustrated. Frequency dependent valve assembly 266 provides frequency dependent damping in rebound only. Frequency dependent valve assembly 266 includes a housing assembly 310 and a spool valve assembly 312. Housing assembly 310 includes an upper housing 314 and a lower housing 316. Upper housing 314 is threadingly or otherwise attached to the end of piston rod 34. Lower housing 316 is threadingly or otherwise attached to upper housing 314.

Spool valve assembly 312 includes a spool valve 320, a check valve 322, an interface 324 and a plurality of valve discs 326 forming a bypass valve assembly, a retaining nut 328, a spring seat 330 and a spring 332. Spool valve 320 is disposed within a fluid cavity 334 defined by housing assembly 310. Check valve 322 includes a valve seat 336 and a valve plate 338. Spool valve 320 is slidably disposed within both valve seat 336 and housing assembly 310. Valve seat 336 is fixedly attached to upper housing 314 by lower housing 316.

Interface 324 is disposed against spool valve 320. The plurality of valve discs 326 are disposed against interface 324. Retaining nut 328 is threadingly or otherwise received on interface 324 to retain the plurality of valve discs 326 on interface 324. Spring seat 330 is disposed against the plurality of valve discs 326 and spring 332 is disposed between housing assembly 310 and spring seat 330 to bias spring seat 330 against the plurality of valve discs 326 and the plurality of valve discs 326 against interface 324.

FIG. 4 illustrates fluid flow during a rebound stroke of shock absorber 20. During a rebound stroke, fluid pressure in upper working chamber 44 and in rebound flow passages 78 will increase until the biasing load on valve plate 88 increases to the point that spring 92 is compressed and valve plate 88 is lifted entirely off of piston body 60 to fully open rebound flow passages 78 as illustrated by arrow 94. Rebound valve assembly 64 is a passive valve assembly with a firm damping characteristic.

At the beginning of the rebound stroke, prior to the opening of rebound valve assembly 64, fluid will flow through a flow path illustrated by arrow 300 which bypasses piston body 60, compression valve assembly 62 and rebound valve assembly 64. Flow path 300 extends from upper working chamber 44 through radial passageway 148 and axial passageway 146 both extending through piston rod 34, through an axial passage 340 in spool valve 320 into a bypass chamber 344 defined by interface 324 and the plurality of valve discs 326. Flow path 300 proceeds around the plurality of valve discs 326 and through an aperture in lower housing 316 into lower working chamber 46. During a high frequency movement, spool valve 320 moves only a small distance. Because of this small movement, the preload created by spring 332 is low and the fluid pressure in bypass chamber 344 will easily deflect the plurality of valve discs 326 to create the flow illustrated by arrow 300 which flows through the aperture extending through lower housing 316. During a low frequency movement, spool valve 320 is able to move a significant distance. This larger movement will move interface 324, the plurality of valve discs 326 and spring seat 330. This larger movement will compress spring 332 which increases the preload generated by spring 332 and the fluid pressure required to separate the plurality of valve discs 326 from interface 324. As the load generated by spring 332 increases, the flow depicted by arrow 300 will decrease to provide a smooth transition from an initially soft damping condition to a firm damping condition for shock absorber 20. The slow closing of fluid flow 300 by the movement of spool valve 320 will provide the smooth transition. Arrow 302 depicts the flow of fluid out of fluid cavity 334 during movement of spool valve 320 during a rebound stroke. Fluid flows from fluid cavity 334 through a tunable orifice 350 in valve seat 336 and into lower working chamber 46. Check valve 322 remains closed during this movement of spool valve 320 during a rebound stroke and opens to allow for the return of fluid into fluid cavity 334 from lower working chamber 46 during a compression stroke.

Figure 5:
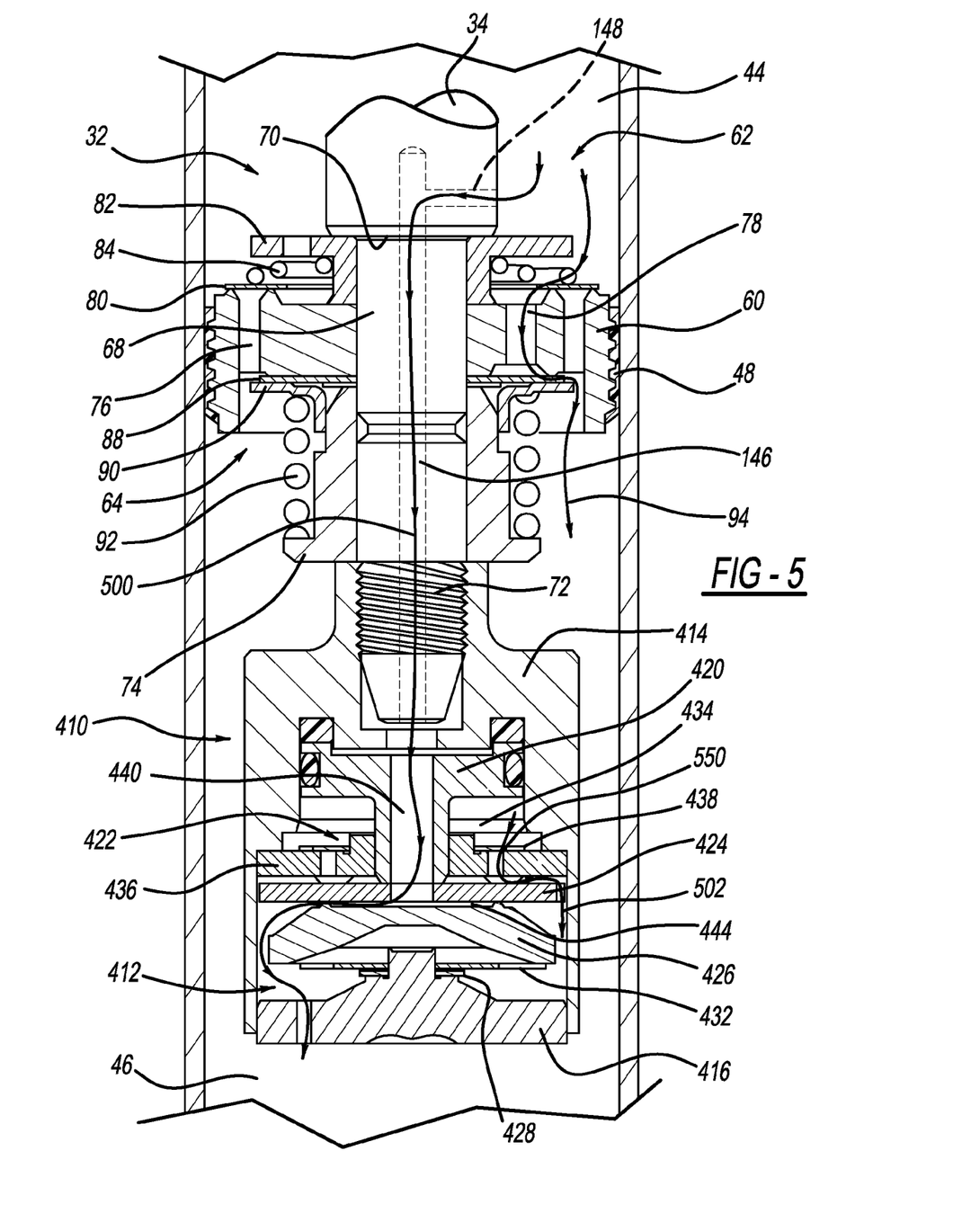
FIG. 5 is an enlarged cross-sectional side view illustrating a frequency dependent device in accordance with another embodiment of the present disclosure which functions during an extension stroke of the shock absorber.

Referring now to FIG. 5, a frequency dependent valve assembly 366 is shown in accordance with another embodiment of the present invention. Frequency dependent valve assembly 366 is a direct replacement for dependent valve assembly 266 as illustrated in FIG. 5. Frequency dependent valve assembly 366 provides frequency dependent damping in rebound/extension only. Frequency dependent valve assembly 366 includes a housing assembly 410 and a spool valve assembly 412. Housing assembly 410 includes an upper housing 414 and a lower housing 416. Upper housing 414 is threadingly or otherwise attached to the end of piston rod 34. Lower housing 416 is threadingly or otherwise attached to upper housing 414.

Spool valve assembly 412 includes a spool valve 420, a check valve 422, an interface 424, a valve body 426, one or more shim discs 428 and a spring 432. Spool valve 420 is disposed within a fluid cavity 434 defined by housing assembly 410. Check valve 422 includes a valve seat 436 and a valve plate 438. Spool valve 420 is slidably disposed within both valve seat 436 and housing assembly 410. Valve seat 436 is fixedly attached to upper housing 414. Interface 424 is disposed against spool valve 420. Valve seat 436 is disposed against interface 424. Spring 432 is disposed between lower housing 416 and valve body 426 to bias valve body 426 against interface 424. The one or more shim discs control the biasing load for spring 432. Interface 424, valve body 426 and spring 432 form a bypass valve assembly.

FIG. 5 illustrates fluid flow during a rebound stroke of shock absorber 20. During a rebound stroke, fluid pressure in upper working chamber 44 and in rebound flow passages 78 will increase until the biasing load on valve plate 88 increases to the point that spring 92 is compressed and valve plate 88 is lifted entirely off of piston body 60 to fully open rebound flow passages 78 as illustrated by arrow 94. Rebound valve assembly 64 is a passive valve assembly with a firm damping characteristic.

At the beginning of the rebound stroke, prior to the opening of rebound valve assembly 64, fluid will flow through a flow path illustrated by arrow 500 which bypasses piston body 60, compression valve assembly 62 and rebound valve assembly 64. Flow path 500 extends from upper working chamber 44 through radial passageway 148 and axial passage 146 both extending through piston rod 34, through an axial passage 440 in spool valve 420 into a bypass chamber 444 defined by interface 424 and valve body 426. Flow path 500 proceeds around valve body 426 and through at least one aperture in lower housing 416 into lower working chamber 46. During a high frequency movement, spool valve 420 moves only a small distance. Because of this small movement, the preload created by spring 432 is low and the fluid pressure in bypass chamber 444 will easily separate valve body 426 from interface 424 to create the flow illustrated by arrow 500 which flows through the one or more apertures extending through lower housing 416. During a low frequency movement spool valve 420 is able to move a significant distance. This larger movement will move interface 424 and valve body 426. This larger movement will compress spring 432 which increases the preload generated by spring 432 and the fluid pressure required to separate valve body 426 from interface 424. As the load generated by spring 432 increases, the flow depicted by arrow 500 will decrease to provide a smooth transition from an initially soft damping condition to a firm damping condition for shock absorber 20. The slow closing of fluid flow 500 by the movement of spool valve 420 will provide the smooth transition. Arrow 502 depicts the flow of fluid out of fluid cavity 434 during movement of spool valve 420 during rebound stroke. Fluid flows from fluid cavity 434 through a tunable orifice 550 in valve plate 438 and into lower working chamber 46. Check valve 422 remains closed during this movement of spool valve 420 in a rebound stroke and opens to allow for the return of fluid into fluid cavity 434 from lower working chamber 46 during a compression stroke.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A shock absorber comprising:
   a pressure tube defining a fluid chamber;
   a piston assembly disposed within said pressure tube, said piston assembly dividing said fluid chamber into an upper working chamber and a lower working chamber;
   a piston rod projecting out of said pressure tube, said piston assembly being attached to said piston rod and said piston rod including an axial passageway that forms an internal bore extending through a portion of a length of said piston rod and acting as a portion of a fluid bypass flow path;
   a frequency dependent valve assembly attached to said piston rod, said frequency dependent valve assembly comprising:
      a housing attached to said piston rod, said housing defining a fluid cavity;
      a spool valve assembly disposed within said fluid cavity, said spool valve assembly including a spool valve and a bypass valve assembly, said spool valve being movable along an axis parallel to an axial center of said piston rod, said spool valve including an axially arranged hole extending through a full length of the spool valve and being in flow communication with said axial passageway of said piston rod, and thus forming a portion of said fluid bypass flow path; wherein
   movement of said spool valve within said fluid cavity in response to movement of said piston rod changes an amount of fluid pressure required to open said bypass valve assembly; and
   wherein said bypass valve assembly includes an interface and a valve disc, said frequency dependent valve assembly further comprising a spring biasing said valve disc into engagement with said interface, a bypass chamber being defined by said interface and said valve disc.

2. The shock absorber according to claim 1, wherein said frequency dependent valve assembly controls fluid flow from said upper working chamber to said lower working chamber.

3. The shock absorber according to claim 1, wherein said frequency dependent valve assembly controls fluid flow from said lower working chamber to said upper working chamber.

4. The shock absorber according to claim 1, wherein said spool valve defines a fluid passage in direct fluid communication with said upper working chamber.

5. The shock absorber according to claim 1, wherein said spool valve defines a fluid passage in direct fluid communication with said lower working chamber.

6. The shock absorber according to claim 1, wherein said spool valve defines a fluid passage in fluid communication with said bypass chamber.

7. The shock absorber according to claim 6, wherein said fluid passage defined by said spool valve is in direct communication with said lower working chamber.

8. The shock absorber according to claim 6, wherein said fluid passage defined by said spool valve is in direct communication with said upper working chamber.

9. The shock absorber according to claim 1, wherein said spool valve defines a fluid passage in direct fluid communication with said bypass valve assembly.

* * * * *